United States Patent Office 3,162,326
Patented Dec. 22, 1964

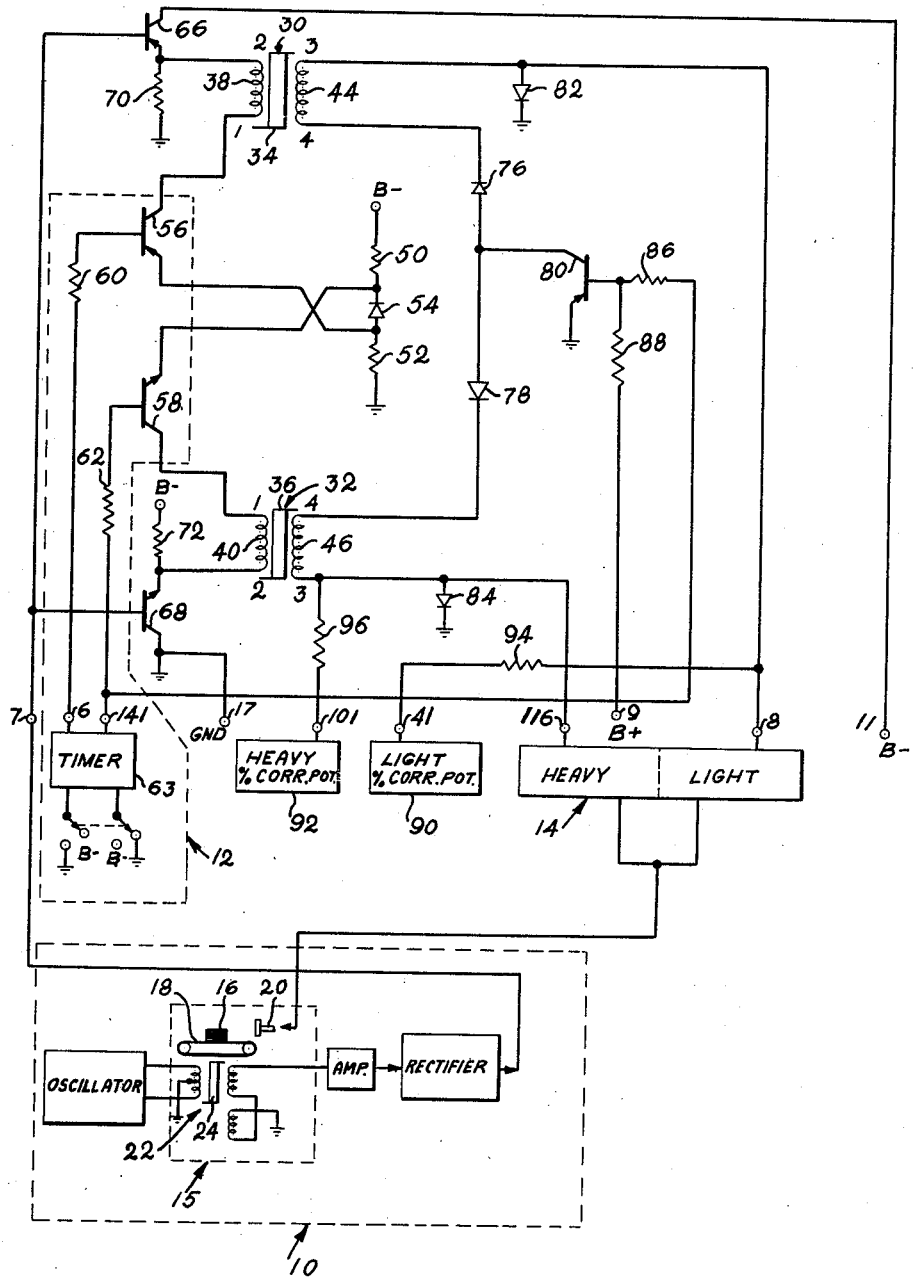

3,162,326
APPARATUS FOR PROCESSING ELECTRICAL SIGNALS
Virgle E. Porter, Country Club Hills, Ill., assignor to Unexcelled Chemical Corporation, New York, N.Y., a corporation of New York
Filed Nov. 27, 1962, Ser. No. 240,392
9 Claims. (Cl. 222—55)

This invention relates to voltage-time converter circuitry and, more particularly, to electrical circuitry for converting a voltage-time signal to a voltage-time output pulse having certain other predictable characteristics.

The present invention contemplates the utilization of an electric signal having certain definitive voltage and time properties, utilizing such as intelligence in performing an operation capable of differentiating between the components of this intelligence. For example, in feeding and then segregating certain products that are to be ultimately processed or packaged in accordance with predetermined weight units, the nature of the product may be such that a constant rate of feed may not at all times provide the desired predetermined weight per unit. In such instances, it may be more practical to regulate or control the feeding mechanism such that the product unit weight will fall within prescribed tolerances.

In this connection, in processing and packaging powdered or granular materials and even sliced products in the food and meat packaging industry wherein it is desired to have a prescribed weight per unit of such product, it inevitably happens that the density of product is, for all practical purposes, an uncontrolled variable. Therefore, in the particular product processing operation, it may prove to be most expedient to change the rate of feed of the product such that, not withstanding density changes, the unit weight registered by a scale will fall within prescribed tolerances. Accordingly, when it is desired to increase the weight of product unit, more material may be delivered to the scale before the particular product unit is segregated with or without relationship to the time factor.

Under these circumstances, the weight registered by the scale must be capable of being automatically interpreted so that this information may then be transferred to the feeding mechanism for proper action. In an exemplary embodiment of the instant disclosure, such transferred information may actuate a servo mechanism which either increases or decreases the rate of advance of the feeding mechanism depending upon the direction of error registered by the scale.

In certain commercial scales, a transformer is employed in which the transformer core supports the scale platform which, incidentally, may be in the form of a continuously or intermittently moving conveyor. Thus, as the product to be processed and packaged is transferred to or deposited on the platform by the feeding mechanism, the core will be lowered in response to the weight of product. This lowering of the core in relation to the transformer windings will induce an output voltage. If the weight of the product unit is acceptable, a "null" reading will be produced. However, if the product unit is underweight, a voltage of a particular polarity will be generated. If the product unit is overweight, a voltage of opposite polarity will result. The magnitude of the output voltage will naturally depend upon the weight of product registered. In accordance with this invention, this generated voltage is utilized as intelligence and suitably applied to operate the servo mechanism which adjusts the rate of advance of the feeding mechanism of the exemplary embodiment discussed in the foregoing.

With this in mind, it is accordingly an object of the present invention to provide an electrical circuitry means for receiving a voltage-time signal of certain magnitude and convert it to a voltage-time signal having certain other predictable characteristics capable of measurement.

Another object is to provide a voltage-to-time converter wherein a timed voltage pulse is integrated and then transferred as a constant voltage pulse, the duration of which is proportional to the magnitude of the input voltage.

A further object is to provide a voltage-to-time converter utilizing a transformer having a core into which certain voltage-time information can be written and then read as desired.

Still another object is to provide a voltage-to-time converter utilizing at least one transformer having a core into which an error signal can be written and then read for purposes of supplying proper correction.

Still a further object is to provide a voltage-to-time converter having a pair of transformers each of which includes a core formed from material into which a voltage-time signal or pulse can be integrated whereby a voltage-time signal proportional to an error in one direction is adapted to be applied to one transformer and an error in the other direction of certain voltage-time magnitude can be applied to the other transformer such that the written information at the proper time can be converted to a volt-time output signal for purposes of supplying the necessary correction.

Other objects and advantages of this invention are provided by a voltage-to-time circuit capable of processing a voltage-time signal of certain magnitude proportional to an error in a particular direction. In this connection, this error signal may be in the form of a voltage pulse of constant width, the amplitude of which is directly proportional to the error. The polarity of the voltage, as for example, in the case of signals generating from a scale may be in direct relationship with lighter and heavier than the prescribed weight. This particular voltage-time signal is then applied to one of a pair of transformers. One transformer is responsive to overweights whereas the other being responsive to underweights. A suitable gating means is effectively employed for directing an underweight signal to the proper transformer and an overweight signal to the other transformer. Each transformer utilizes a core made from a material capable of integrating voltage and time pulses. In this connection, the material from which the core is made possesses a predictable and definitive hysteresis curve characteristic of the particular material. Magnetic energy is capable of being stored in such material and then released in direct proportion to applied voltage-time signals. Thus, in applying a timed voltage pulse to the primary of one of the transformers and having this signal integrated by the transformer core, a constant voltage applied across the secondary of the transformer will produce a signal of a duration dependent upon the voltage of the error signal. This time pulse may now be utilized to correct the error that produced the timed voltage pulse in the first instance.

Means are incorporated in the voltage-to-time converter whereby only a percentage of the converted error is utilized in order that correction may be made in increments rather than all at once, thereby reducing the detrimental effects of false error signals. In the specific exemplary embodiment discussed in the above, the time pulse may be applied to a servo mechanism which will operate for this period of time for purposes of adjusting the rate of advance of the feeding mechanism proportionately.

Other objects and advantages will become apparent from the following detailed description of the invention which is to be taken in conjunction with the accompanying drawings in which the sole figure is illustrative of the voltage-to-time converter incorporated into a weighing mechanism for use with a feeding mechanism for a product as well as a servo mechanism for regulating the operation of the feeding mechanism.

In the drawings, the voltage-to-time converter circuitry is shown associated with an error signal transmitting means 10, a gating means 12 responsive to such transmissions for regulating the proper cycle of operation of the converter, and a servo means 14 responsive to the output of the converter to correct the error. In the exemplary embodiment of the invention disclosed herein, the error transmitting means 10 may be in the form of a scale 15 capable of weighing a product 16 on a moving scale 18. The product 16 may assume a number of different forms as, for example, slices of a particular material such as meat, a receptacle containing a liquid, powdered or granular material all of which may be directed to the moving conveyor 18 by means of a feeder or dispenser 20. As illustrated, the transformer input may be coupled with a suitable A.C. source through an oscillator capable of generating the selected frequency. The output of the transformer may be suitably amplified and rectified to produce the D.C. error signal to be processed by the converter.

In a successful application of the invention, the scale 15 may assume the form of the commercially available model known as the Wrightronic Checkweigher manufactured by the Wright Machinery Co., division of Sperry Rand Corporation of Durham, North Carolina. In this particular construction of scale, a differential transformer 22 is conveniently incorporated. The core 24 of the transformer directly supports the weigh conveyor 18. Suffice it to say, this scale 15 is of such a nature that the output of the transformer secondary yields a voltage roughly proportional to the scale position governed by the quantity of product 16 on the conveyor 18.

From time-to-time, possibly because of the nature of the product 16, the weight registered by the scale 15 may be either heavier or lighter than the prescribed weight. Under such circumstances, it would be extremely desirable, if not necessary in certain instances, to provide a correction to the feeding means 20 and thereby change the rate of feed of the product to the conveyor 18.

With respect to the scale 15, an A.C. voltage is applied across the primary of the transformer 22. The output of the transformer secondary is a function of the position of the core 24. It should be noted that the output voltage decreases linearly from a maximum as the core approaches a central position in the transformer 22. At some point, a "null" is reached and, as the core is further advanced, the output again increases linearly. The signal output before null is of opposite phase from the signal output past null.

The voltage-to-time converter of the present invention advantageously employs in the exemplary embodiment herein a substantially rectangular hysteresis loop magnetic core, which loop preferably approaches squareness in configuration. This core has the property and ability to integrate volt seconds thereby rendering it adaptable for the contemplated applications. A suitable material found to perform satisfactorily under the contemplated conditions and applications is available commercially under the name "Orthonol" supplied by the manufacturer Magnetics Inc., Butler, Pa. It is essentially an alloy having approximately 50% nickel and 50% iron. This material is available in tape form and when wound on a bobbin in forming, the core has improved speed of response. Other similar materials and tape wound cores possessing the desired properties and characteristics are available, as for example, by a supplier The Arnold Engineering Company, Marengo, Illinois. Traversing the major B-H curve of such materials requires a fixed number of volt seconds. The total seconds is defined by the equation: $ET=MN10^{-8}$, where $E$=volts, $T$=seconds, $M$=flux in maxwells and $N$=number of turns of wire on the core. This quantity represents the largest correction possible in a given unit and is analogous to interchanging the north and south poles of a magnet.

When used under conditions of pulse excitation, these core materials have the ability to switch from a state of negative remanence to positive saturation, or from positive remanence to negative saturation in a matter of a few micro-seconds.

In actual practice, it will be found that it is not mandatory that the hysteresis loop be traversed entirely prior to each reversal. Thus, a certain quantity or magnitude of volt seconds can be applied to the core winding and later, by applying a magnetizing force of opposite polarity, the same number of volt seconds will be recovered.

Since the core integrates volt seconds, either may be held constant while observing the other. For example, with a constant voltage, the core will in effect respond to time. With a constant time, the core excitation will be proportional to voltage. As will become evident shortly, the exemplary embodiment of the present invention maintains the time factor constant and measures voltage, by writing a proportioal change in the magnetic saturation of the core; subsequently, this is converted to a time factor following remanence.

In the illustrated converter, a pair of substantially rectangular hysteresis loop core transformers 30 and 32 and associated circuitry function to provide time pulses to the servo mechanism 14 for adjusting the feeding means 20 to correct its operation in proportion to the magnitude of error detected and transmitted by the scale 15. The transformers 30 and 32 will include, respectively, cores 34 and 36 each of which is formed from a substantially rectangular hysteresis loop material in wound tape form. For the particular application being discussed, a pair of transformers are required one for each type of correction, heavy and light. A gating means 12 permits the scale output voltage to be applied to one end of the primary windings 38 and 40, respectively, of the transformers 30 and 32. As will be explained, the other end of the primary windings is returned to a reference voltage. If the scale output is not the same as this reference, one transformer is further driven towards magnetic saturation in one direction whereas the magnetic flux stored in the other is reversed all to an extent depending on the voltage difference. The amount of flux reversed or switched in the latter instance is proportional to the product of the voltage applied to the particular primary winding, and the time interval for which it is applied. The gating means 12 serves to produce a constant pulse with each time the scale 15 is read. Under such circumstances, the voltage output of the scale 15 is applied for this constant time period to the primaries 38 and 40 of the respective transformers 30 and 32. The amount of flux switched is proportional to the error and which of the cores is switched is dependent on the direction of the error.

The output voltage of the scale 22 is, accordingly, sampled for a constant period of time. This will be referred to herein as the "write" time and corresponds to storing information into either of the cores of the transformers 30 and 32. Since the time is repeated for each weighing, the flux excursion stored is proportional to the scale position and, more particularly, the descent of the core 24.

Shortly after the "write" cycle, the core is "read." This is accomplished by a constant voltage which yields a time pulse whose duration is proportional to the scale position or, in other words, the weight registered. In this connection, immediately after "write" pulse, upon signal, a voltage is applied to the transformer secondaries 44 and 46. If one core has been switched, it will be switched back to its original saturated state. The time required to bring this about is directly proportional to the amount of flux that was reversed by the error signal, bearing in mind that this will occur provided that the switching voltage is constant. After reading, the magnetic state of the core is such that a new cycle can start.

Thus, writing corresponds to setting and reading corresponds to resetting the cores.

When the core again reaches saturation, the switching voltage is short circuited. This switching voltage, as applied to either the secondary 44 or 46 of the respective converter transformers 30 and 32 is sensed by the servo mechanism 14 and, more particularly, either the increase or decrease side thereof depending upon the direction of error. A pulse is applied then to either the increase or decrease side of the servo mechanism 14, as the case may be, for the duration of the switching time of the core of the converter transformer dictating the correction.

The network consisting of resistors 50 and 52 and diode 54 provides the referenced voltage for the respective transformer cores 34 and 36 comparable to "on weight" voltage and against which the D.C. signal from the scale 22 is compared. Transistors 56 and 58 serve as D.C. gates and may be considered part of the gating circuitry 12. These transistors are connected to one end of the transformer primaries 38 and 40, respectively, to thereby permit, upon signal, the exposure of the transformers 30 and 32 to the referenced voltage during the write cycle. These transistors are turned on by the grounding of the end of the resistor 62 and the connection of the end of resistor 60 to the negative voltage upon signal. This particular condition is illustrated in the drawing. In this connection, the gating circuit 12 serves to supply a negative polarity voltage at pin 6 which turns transistor 56 on for the duration of the write cycle as determined by the timer 63 of the gating circuit 12. At the same time, this circuit earths pin 141 to ground during the write cycle thereby turning transistor 58 on. In the absence of a timed pulse from the gating circuitry, the resistor 62 is returned to a negative voltage and the resistor 60 to ground. This has the effect of turning off both transistors 56 and 58.

The output of the scale 22 appears at pin 7 connected to the base of transistors 66 and 68 as a D.C. voltage signal. These transistors perform as emitter follower amplifiers required to drive the transformers 30 and 32. These transistors are also coupled with emitter load resistors 70 and 72, respectively. The amplified voltage, under such circumstances, appears at terminal 2 of transformer 30 and terminal 2 of transformer 32. However, current does not flow in either transformer until the transistor switches 56 and 58 are closed to initiate the write cycle.

Both transformers 30 and 32 are not returned to the same reference voltage, but are separated by the drop across diode 54. This drop compensates for some of the non-linearities in the system by providing an overlap in voltages appearing at the emitters of transistors 56 and 58, and it also accounts for the voltage drop occurring in transistors 56 and 58, 66 and 68, as well as that incident to the operation of the servo mechanism 14.

The transformer secondaries 44 and 46 should preferably contain many more turns than their respective primaries such that a large voltage can appear across one of them depending on the magnitude of the error. Since the voltage should appear across one and not the other, the secondaries are isolated by diodes 76 and 78. A transistor 80 has its collector coupled with the junction between these diodes and the functions as a high voltage transistor. This transistor 80 is turned off during the write cycle thereby allowing at such time either secondary winding 44 or 46 to produce a high voltage on terminal 4 of the respective transformers 30 and 32. Terminal 3 of each transformer secondary, on the other hand, is prevented from going positive at this particular time by the diodes 82 and 84. Resistor 86 extending from the base of transistor 80 is connected to the normally "on" side of the gating circuitry 12. Under such circumstances, this transistor is held in a conducting state except during the write pulse cycle. Resistor 88 is also coupled with the transistor base and serves as a bias resistor.

After the write pulse, the transistor 80 is turned on and connects terminal 4 of the secondaries 44 and 46 of the respective transformers 30 and 32, to ground. A voltage is then applied to the other end of each percentage correction potentiometers 90 and 92, notably pins 41 and 101 respectively in such circuitry. Current will, accordingly, continue to flow under this voltage until such time as the switched transformer core resets.

If the scale output indicated "heavier" than the reference, the core of transformer 32 was switched to an extent depending on the magnitude of the error. If the error was "light," transformer 30 was switched. In other words, if the error signal as applied to terminal 2 is more negative than the voltage appearing at terminal 1 of transformer 30, its core 34 is switched in proportion to the voltage difference between the induced voltage signal from the scale and the reference voltage established by the reference voltage network. The time, under such circumstances, as explained previously, is maintained at a constant by the timer 63 of the gating circuit 12. If, on the other hand, the error signal as applied to terminal 2 is less negative than the voltage appearing at terminal 1 of transformer 32, its core 36 is switched by an amount which is proportional to the voltage difference between the applied voltage signal and the voltage reference.

When either transformer 30 or 32 is being written into, a voltage is induced in the secondary of the excited transformer. The polarity of the induced voltage is such as to cause a negative voltage to appear at terminal 4 of the transformer 32. However, no current flows in the circuit of the particular transformer switched because transistor 80 opens when pin 141 is grounded, as is the case during the write cycle.

At the completion of the write cycle, transistor 80 is turned "on" thereby grounding terminal 4 of both transformers 30 and 32. Voltages appearing at pins 101 and 41 will, under such circumstances, cause a current to flow through the transformer secondary windings. The polarity of this current is such as to cause the cores to be reset. However, as previously explained, only one core was set at the end of the write cycle in correspondence to the error signal and, therefore, only one core will reset. The resetting determines the read time; and the voltage, therefore, is sustained for the time necessary to resaturate the core of the transformer switched. This time is directly proportional to the error. The timed pulse thus produced will be applied to the servo mechanism 14 to accomplish the necessary correction depending on the side at which the error exists.

The core to be reset presents a high impedance while switching which causes a voltage to appear at either pin 8 or 116 depending upon the direction of correction. This voltage persists until the appropriate core saturates, at which time, this particular core's secondary winding presents a very low impedance. A sharp drop in the voltage will then occur to thereby terminate the correction signal. At this time, the core is reset and ready to accept a new write pulse.

The voltage which resets the core of the particular transformer switched dictates the percentage of correction. This voltage is adjusted by means of the percentage correction potentiometers 90 and 92.

In a commercial application of the invention, a scale output approximately 3 volts different from the reference, applied for 20 milli-seconds (the period of time determined by a constant pulse width for each reading of the scale 15 and, consequently, the write cycle) will just reverse all of the magnetic flux in the core of the transformer to be switched. The amount of flux switched was, in this case, proportional to an error up to one ounce and, which of the cores switched, is obviously dependent upon the direction of the error.

The reference voltage was set at approximately 4 volts. The transformer core 24 was adjusted to produce a D.C. voltage output after suitable amplification and rectification of about 4 volts when the desired weight was on the weight conveyor 18. For a weight one ounce heavy, the output, as applied to pin 7, was approximately one volt and for a weight one ounce light, the output at this pin was 7 volts. In the mentioned commercial application of the invention, transistors 66 and 68 in performing as emitter follower amplifiers, were designed to yield a voltage gain of approximately one with a substantial gain in current. The constants of the core and secondary winding of the converter transformers 30 and 32 of this commercial embodiment were such that the time for switching of the core for a one ounce error was about 250 milliseconds with the lowest switching voltage applied. The switching voltages were adjustable over a 3 to 1 range for each transformer to provide a means for adjusting the percent correction. Accordingly, the servo mechanism 14 operated to correct for a certain percentage of the total error. The percentage of full correction was set at anywhere between 30 to 50% for optimum results. Thus, in the correction of slice thickness, previously described, incremental adjustment of the feed mechanism 20 was possible. The reason this was desirable being that pockets or voids as well as zones of less density would be encountered in the loaf being sliced and stacked on the weight conveyor 18. Consequently, the signal to correct would be false. Under such circumstances, the proper setting of the feed mechanism 20 may be maintained during a major part of the operation of the apparatus. If desired, the proportion of correction for underweights as compared with overweights need not be the same. In the specific embodiment mentioned in the above, it was found to be most desirable to permit more overweight stacks to be formed than underweights.

Thus, the aforenoted objects and advantages, among others, are most effectively attained. Although a single somewhat preferred embodiment has been disclosed herein, this invention is in no sense limited thereby; and its scope is to be determined by that of the appended claims.

I claim:

1. An electrical circuit for deriving from a first signal representing in amplitude an element of input data a second signal the duration of which represents the said data element, comprising a transformer means including a core and at least one winding to energize and reset the core, the core being formed from material having hysteresis characteristics such that the stored magnetic energy produced by the application of an input signal to the means varies approximately with the time integral of the amplitude of the input signal, means for generating a constant-voltage signal for saturating the core of the said transformer means, and control means operative when the core has been saturated to apply the input signal to the transformer means for a predetermined period, the direction of saturation and the polarity of the signal being such that the magnetic condition of the core will depart from saturation to an extent dependent on the amplitude of the input signal, and thereafter to apply to the transformer means the constant voltage signal to reset the core to a saturated condition, whereby the duration of the output signal derived from the transformer means during the application of the constant-voltage signal is representative of the input data element.

2. An electrical circuit according to claim 1 wherein said transformer means comprises two transformers and in which the signal generating means, in response to an input signal, applies corresponding voltage pulses of known duration to the two primary windings in such polarities that one transformer core is driven further into saturation and the other is driven away from saturation and stores the input, and in which the means for deriving the output signal applies a constant voltage across both secondary windings.

3. An electrical circuit according to claim 2, including a gating means controlling the application to the transformers of a reference voltage for comparison with the voltage pulse so that the difference of such voltages is applied to the transformers.

4. An electrical circuit according to claim 3 wherein the gating means includes transistors functioning as switches that are normally open and adapted to close for a given duration to ensure the application of the voltage pulse to the transformers.

5. An electrical circuit according to claim 4 wherein the input signal is applied to the transformers through an emitter-follower amplification network.

6. An electrical circuit according to claim 4 wherein a transistor switch is coupled to the output side of each of the transformers, the circuit including means controlled by the gating means for closing the output at the end of the writing of the timed voltage pulse into the core of one of the transformers.

7. An electrical circuit according to claim 6 wherein means are coupled with the outputs of both the transformers and the transistor switch for applying a certain percentage of the output of the switched transformer to a servo-mechanism upon the closure of the transistor switch.

8. An electrical circuit according to claim 3 wherein the cores are formed from a magnetic material of substantially rectangular hysteresis loop.

9. Apparatus for dividing a product into portions of predetermined weight comprising scale means set to register a predetermined weight of product, feed means for feeding the product to the scale means, servo means for adjusting the rate of advance of the feed means to increase or decrease the rate of advance and thereby increase or decrease the amount of product on the scale means, and an electrical circuit according to claim 4 coupled with the scale means and receiving an input signal corresponding to an error in the weight registered by the scale means, the voltage derived from the transformer being used to control the rate-adjusting servo means.

References Cited in the file of this patent

UNITED STATES PATENTS

| | | |
|---|---|---|
| 2,609,965 | Kast | Sept. 9, 1952 |
| 3,056,116 | Crane | Sept. 25, 1962 |
| 3,087,071 | Richards | Apr. 23, 1963 |